(12) United States Patent  (10) Patent No.: US 7,705,552 B2
Miyashige et al.  (45) Date of Patent: Apr. 27, 2010

(54) ROBOTIC SYSTEM

(75) Inventors: Masayuki Miyashige, Tokyo (JP);
Yasuyuki Suzuki, Chiba (JP); Chihiro Uemura, Chiba (JP)

(73) Assignee: Futaba Corporation, Chiba-ken (JP)

( * ) Notice: Subject to any disclaimer, the term of this patent is extended or adjusted under 35 U.S.C. 154(b) by 297 days.

(21) Appl. No.: 11/873,003

(22) Filed: Oct. 16, 2007

(65) Prior Publication Data

US 2008/0122394 A1 May 29, 2008

(30) Foreign Application Priority Data

Oct. 17, 2006 (JP) ............................. 2006-282184

(51) Int. Cl.
*G05B 11/01* (2006.01)
(52) U.S. Cl. ............. 318/560; 318/568.17; 318/568.12
(58) Field of Classification Search ................. 318/560, 318/568.17, 568.12, 568.11; 901/1; 700/245
See application file for complete search history.

(56) References Cited

U.S. PATENT DOCUMENTS 6,789,338 B2  9/2004  Sano et al.
2004/0236467 A1  11/2004  Sano
2005/0240308 A1*  10/2005  Kaneko et al. .............. 700/245
2006/0138988 A1*  6/2006  Kaneko et al. .............. 318/560

FOREIGN PATENT DOCUMENTS

| CN | 1549758 A | 11/2004 |
| JP | 2001-287180 | 10/2001 |
| JP | 2005111661 | 4/2005 |
| JP | 2006-051586 A | 2/2006 |

OTHER PUBLICATIONS

First Office action in corresponding Chinese patent application 2007103000386.8 mailed Sep. 25, 2009.

\* cited by examiner

*Primary Examiner*—Karen Masih
(74) *Attorney, Agent, or Firm*—Quarles & Brady LLP

(57) ABSTRACT

A robotic system is provided that enables easy manipulation and various operations. A walking operation allocated to a manipulated switch operation section is performed. Meanwhile, the right ankle roll axis control motor, the left ankle roll axis control motor, right hip joint roll axis control motor, and the left hip joint roll axis control motor are driven according to the operation amount of a manipulated analog operation section. Thus, the barycentric position of the robot is shifted to change the traveling direction of walking.

5 Claims, 4 Drawing Sheets

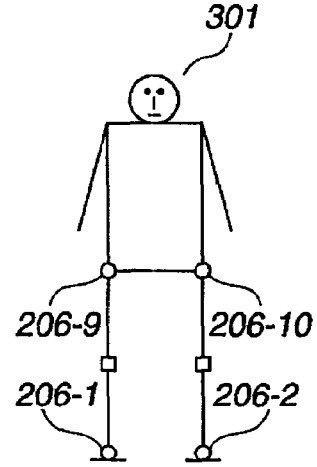 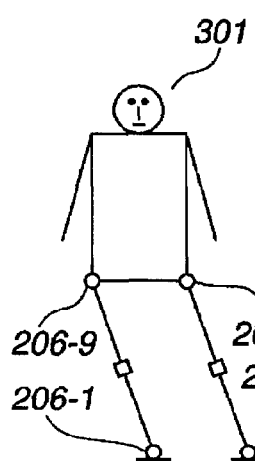 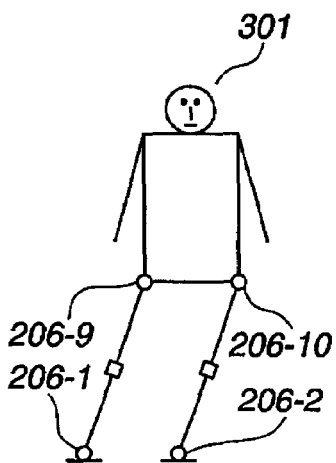
FIG.4(b)　　FIG.4(a)　　FIG.4(c)
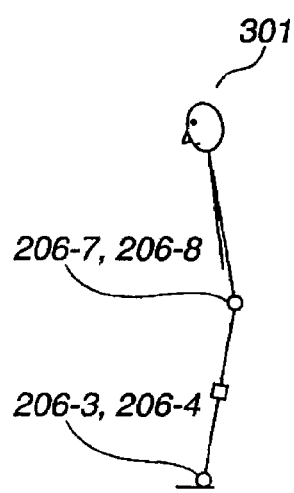 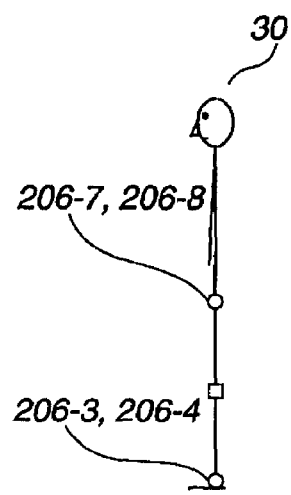 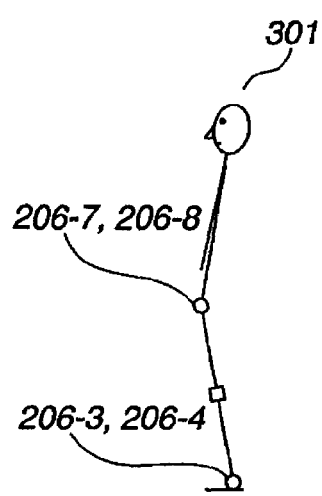
FIG.5(b)　　FIG.5(a)　　FIG.5(c)

ROBOTIC SYSTEM

CROSS REFERENCE TO RELATED APPLICATION

This application claims the priority benefit of Japanese Patent Application No. 2006-282184 filed on Oct. 17, 2006.

STATEMENT REGARDING FEDERALLY SPONSORED RESEARCH

Not Applicable

BACKGROUND OF THE INVENTION

1. Field of the Invention

The present invention relates to robotic systems for remotely controlling robots.

2. Description of the Related Art

Conventionally, robotic systems for remotely controlling a robot have been developed for games or the like. An example of such a robotic system is disclosed in Japanese Patent Publication No. 2006-51586.

When the conventional robot having a large number of joints, such as a humanoid robot, is remotely controlled, a switch having operation sections attached on a transmitter is on/off operated in such a way that the robot performs motions allocated in advance to each operation section.

In order to perform the motions allocated in advance to each operation section through the on/off operation of each operation section of the switch, complicated motions are allocated to the respective operation sections so that the robot can perform in the complicated motions through a simple manipulation.

However, the conventional robot can perform only regeneration of the motions allocated in advance to each operation section and an automatic attitude control motions utilizing a sensor such as a gyro-sensor. Accordingly, an user's will cannot be reflected to the real time operation of the robot. Thus, the motions of the robot are restricted and less appealing in amusements.

SUMMARY OF THE INVENTION

The present invention is to provide a robotic system capable of implementing various motions by a simple manipulation of the robotic system.

According to the present invention, the robotic system comprises a transmitter including a switch operation section for instructing allocated motions, an analog operation section for instructing motions corresponding to an operation amount, control signal output means for outputting a control signal according to operations of the switch operation section and the analog operation section, and transmission means for transmitting the control signal; a robot including plural joints and plural motors for driving each of the joints; receiving means for receiving and outputting control signals from the transmitter; and control means for driving in response to control signals from the receiving means and controlling the joints of the robot.

In the transmitter, the control signal output means outputs a control signal in accordance with manipulation of the switch operation section and the analog operation section. The transmission means transmits the control signal. The receiving means receives and outputs the control signal from the transmitter. The control means drives the motor that controls the joints of the robot in response to the control signal from the receiving means for controlling the joints of the robot.

The control means responds to the control signal and drives the motors in such a way that each of the motions instructed by the switch operation section and the analog operation section is added. The motion instructed by the analog operation section corresponds to an attitude control motion of the robot. The attitude control motion may be the control motion to shift the barycenter position of the robot. The control means drives a motor that moves at least the ankle joint and the hip joint of the robot so as to shift the barycenter position. At least, a roll axis control motor and a pitch axis control motor may be mounted to each joint as a motor for controlling each ankle joint and each hip joint. According to the present invention, the robotic system that can implement various motions by a simple manipulation of the robotic system.

BRIEF DESCRIPTION OF THE DRAWINGS

FIG. 4 is a diagram explaining barycentric position horizontal movement control in the robotic system according to an embodiment of the present invention; and FIG. 5 is a diagram explaining barycentric position forward/backward movement control in the robotic system according to an embodiment of the present invention.

DETAILED DESCRIPTION OF THE INVENTION

A robotic system according to an embodiment of the present invention will be explained with reference to an example of a biped walking robot.

Figure 1:
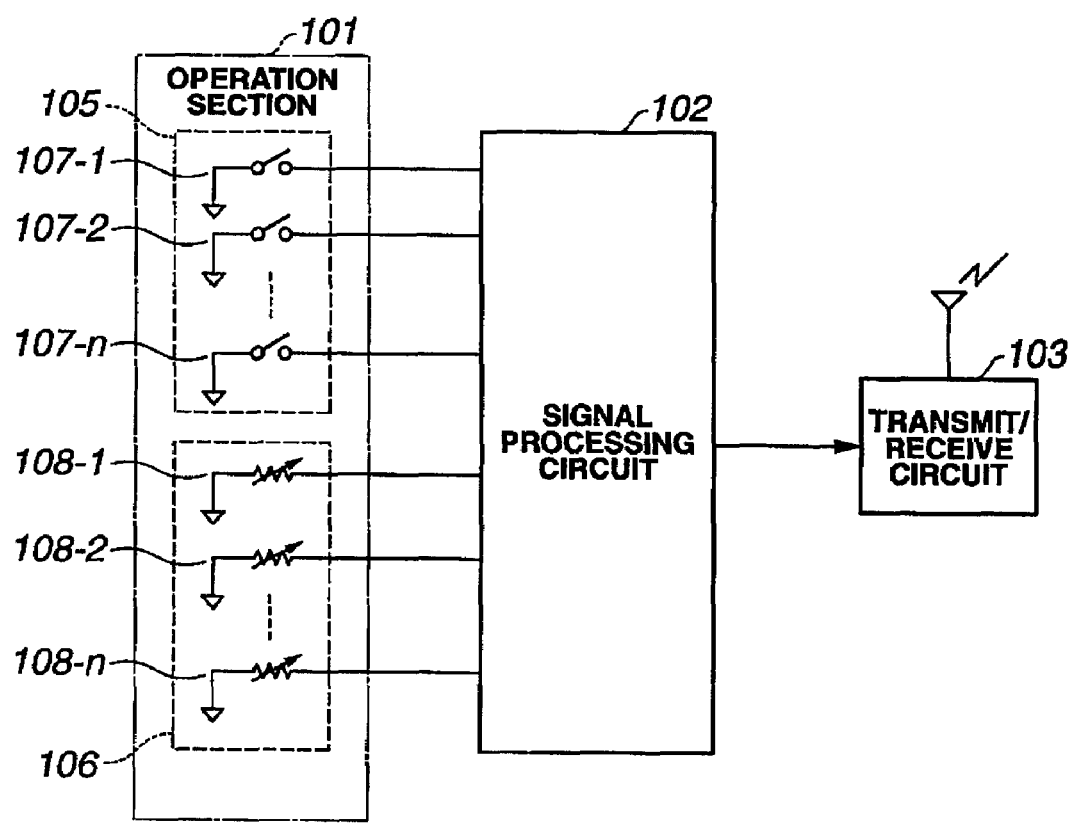
FIG. 1 is a block diagram illustrating a transmitter used for a robotic system according to the present invention.

Referring to FIG. 1, the transmitter for remotely controlling a robot includes an operation section 101, a signal processing circuit 102, and a transmit/receive circuit 103. The operation section 101 includes an allocation operation instructor 105 for instructing allocated motions and an analog quantity instructor 106 for instructing the motions corresponding to an operation or manipulation amount. The allocation operation instructor 105 formed of switches, includes plural switch operation sections, such as, for example, button switches 107-1 to 107-n, each of which is on/off operated to indicate the allocated motions. Mutually different motions, such as walking motion, rising motion, and so on, are allocated to the switch operation sections 107-1 to 107-n, respectively. The analog quantity instructor 106 includes variable resistors operable externally and plural analog operation sections for example, operation sticks 108-1 to 108n, each of which indicates the movements corresponding to the analog quantity corresponding to an amount of the operation of the analog operation sections.

As described in detail later, two analog operation sections 108-1 and 108-2 of the analog operation sections 108-1 to 108-n instructs the motion for shifting the barycenter position of the robot rightward and leftward and the motion for shifting the barycenter position of the robot forward and backward, and also instructs the shifting motion of the barycenter position by the amount corresponding to the operation amount of each analog operation section 108-1 and 108-2.

The signal processing circuit 102 outputs a control signal corresponding to the operations of the switch operation sections 107-1 to 107-n and the analog operation sections 108 to 108-n, respectively. The control signal includes information representing the switch operation sections 107-1 to 107-n manipulated, namely, information indicating the motions allocated to the analog operation sections 107-1 to 107-n, and information representing the switch operation sections 108-1 to 108-n manipulated and information representing operation amounts of the analog operation sections 108-1 to 108-n manipulated, namely, information indicating a motor corresponding to the analog operation sections 108-1 to 108-n manipulated and information indicating the control amount of the motor.

The transmit/receive circuit 103 modulates and wirelessly outputs the control signal received by the signal processing circuit 102. In the present embodiment, the transmit/receive circuit 103 is used to feed back the signal representing the control state of equipment to be controlled, namely a robot to be described later. However, if the equipment is merely controlled, the receiving function is not required. Therefore, a transmission circuit may be used instead of the transmit/receive circuit 103. The signal processing circuit 102 configures control signal output means and the transmit/receive circuit 104 configures transmission means.

Figure 2:
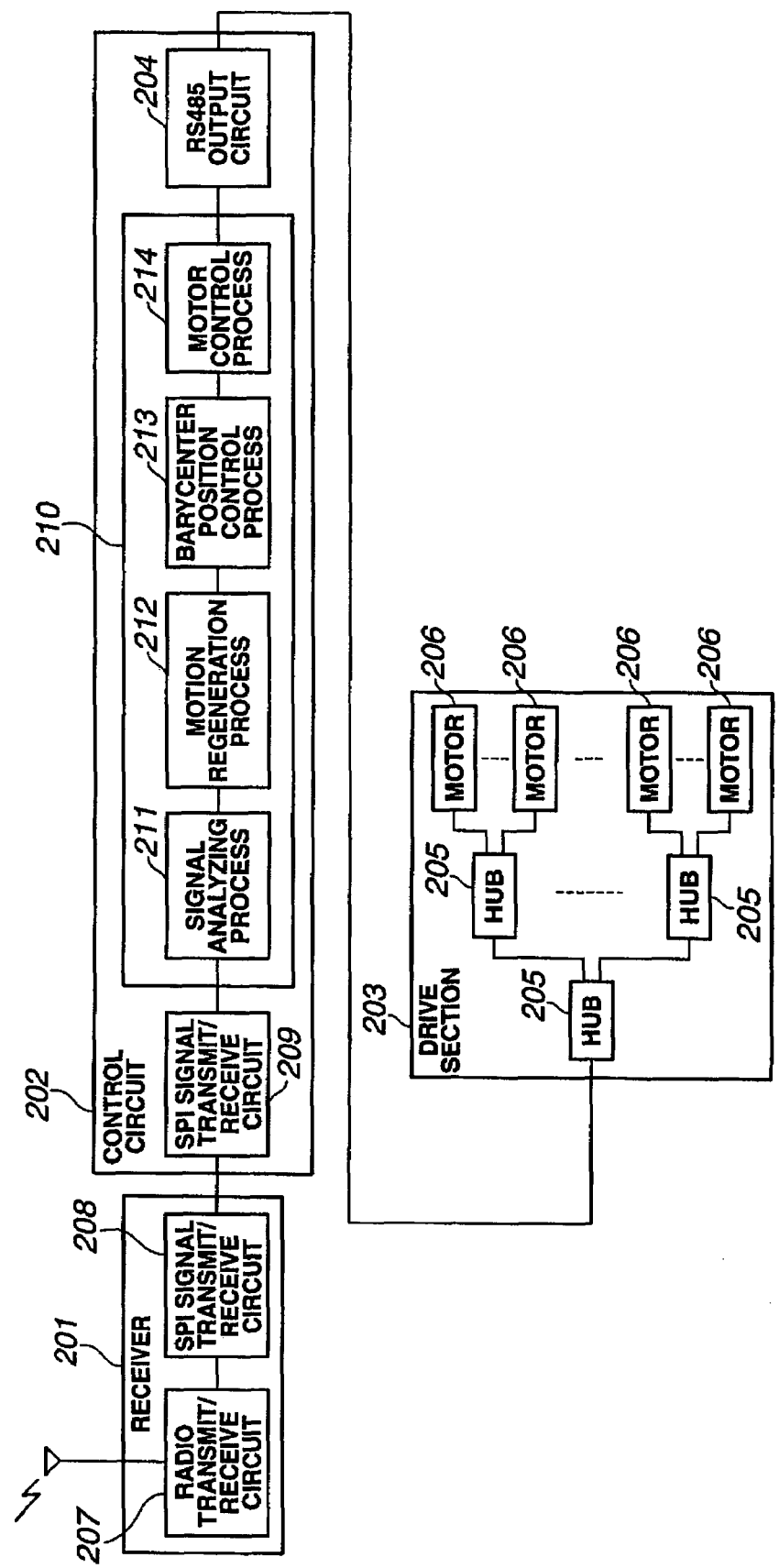
FIG. 2 is a block diagram illustrating a receive controller used for the robotic system according to the present invention.

Referring to FIG. 2, the receiving controller includes a receiver 201, a control circuit 202 and a driver 203. The receiver 201 configures receiving means and the control circuit 202 configures control means. The receiver 201 includes a radio transmit/receive circuit 207 for receiving, demodulating, and outputting control signals from the transmitter and a SPI signal transmit/receive circuit 208 or a SPI (Serial Peripheral Interface) interface for receiving and outputting control signals from the radio transmit/receive circuit 207. The radio transmit/receive circuit 207 and the SPI signal transmit/receive circuit 208 are used to feed back the signal representing the control condition of the equipment to be controlled. However, if the equipment is merely controlled, the receiving function is not required. In this case, a transmission circuit may be used instead of the receiving circuits 207 and 208.

The control circuit 202 includes a SPI signal transmit/receive circuit 209 or a SPI interface for receiving and outputting the control signal from the receiver 201, a processing circuit 210 for performing a process dealing with the control signal received by the SPI signal transmit/receive circuit 209 and outputting control signals in a format suitable for motors 206, . . . 206, and a RS485 output circuit 204 or a RS485 interface for outputting the control signals from the processing circuit 210 to the driver 203. As described hereinabove, in the SPI signal transmit/receive circuit 209, a receiver may be used instead of the transmit/receive circuit.

The processing circuit 210 is formed of a central processing unit (CPU), and is shown as a functional block in FIG. 2. The processing circuit 210 performs a signal analyzing process 211 of the control signal received from the SPI signal transmit/receive circuit 209, a motion regeneration process 212 of the controlled equipment in accordance with manipulations of the switch operation sections 107-1 to 107-n, a barycenter position control process 213 of the controlled equipment in accordance with manipulations of the analog operation sections 108-1 to 108-n, and a motion control process 214 for reflecting the motion regeneration process 212 and the barycenter position control process 213 to the operation of the controlled equipment. Thus, the processing circuit 210 outputs the control signal in which respective operations indicated by the switch operation sections 107-1 to 107-n and the analog operation sections 108-1 to 108-n are added. The RS485 output circuit 204 receives the control signal from the processing circuit 210 and outputs the control signal to the driver 203.

The driver 203 includes plural hubs 205, . . . 205, and plural dc motors 206, . . . 206 connected to any one of the hubs 205. Each of the motors 206 drives respective joints of the controlled equipment. The driver 203 rotatably drives the motor 206, . . . 206 corresponding to the control signal via the hubs 205, . . . 205. In this manner, the drive operation, in which respective operations indicated by the switch operation sections 107-1 to 107-n and the analog operation sections 108-1 to 108-n are added, is performed to the motor 206, . . . 206. The driver 203 constructs a robot including the robot body to be described later.

Figure 3:
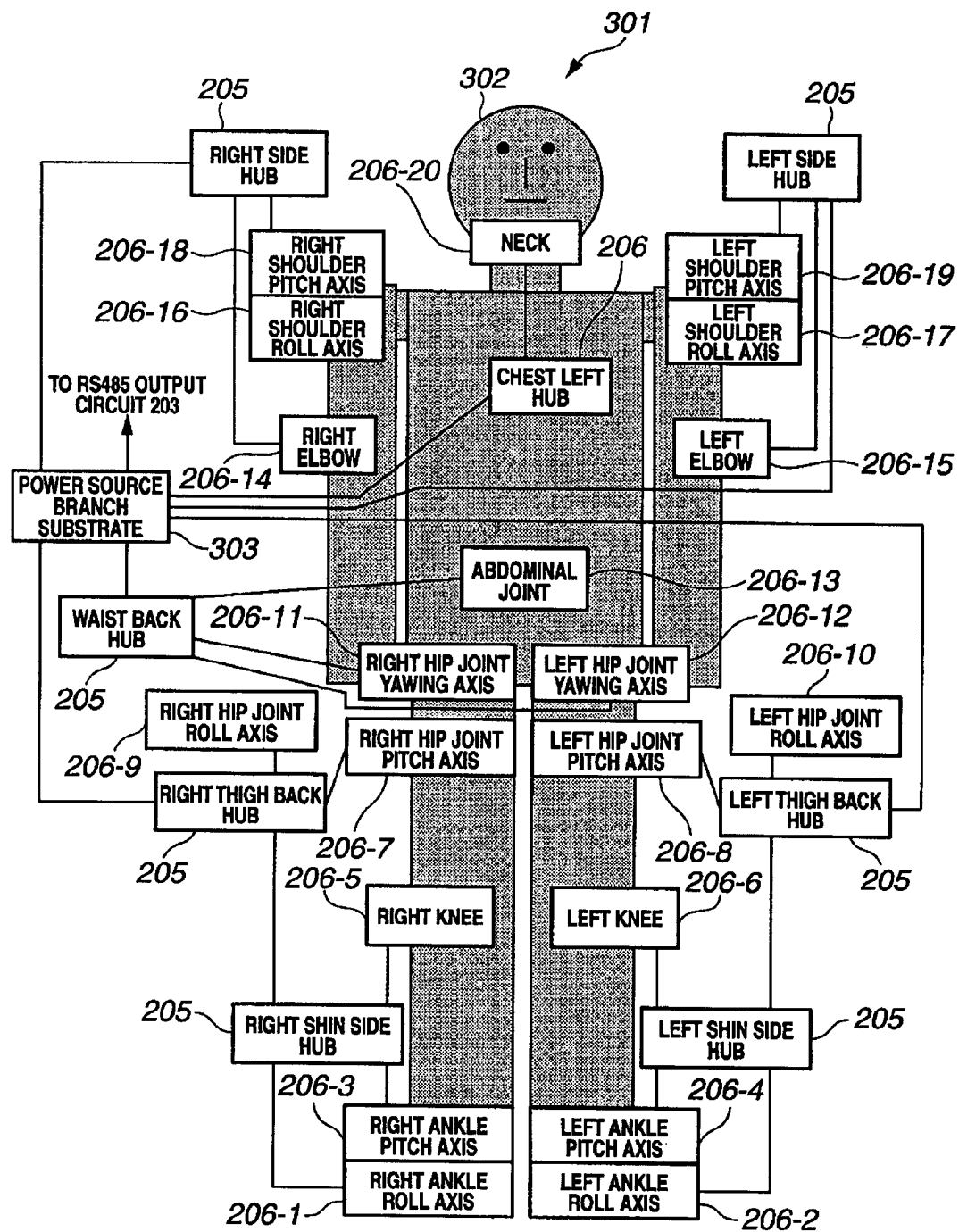
FIG. 3 is a diagram illustrating a robotic configuration used for the robotic system according to an embodiment of the present invention.

FIG. 3 is a diagram illustrating the configuration of a robot 301 used in the robotic system according to an embodiment of the present invention. Referring to FIG. 3, like numerals are used to show the same elements as those in FIGS. 1 and 2. The branch reference numbers 1 to 20 are used to indicate the motor 206 as a function of joint so as to distinguish other motors 206.

The biped walking robot 301 as a controlled equipment which is made like a humanoid has the robot body 302 having plural joints and a driver 203. Respective joints are provided with the motors 206-1 to 206-20 connected via the hubs 205 in the driver 203 and are moved by driving the motors 206-1 to 206-20. The hubs 205 and motors 206-1 to 206-20 are provided with drive power via a power source branch substrate 303 which includes the hub 205, and are connected to a control circuit 202 and a RS485 output circuit 204.

FIG. 4 is an explanatory diagram for effecting control to shift the barycenter of the robot 301 horizontally. FIG. 5 is an explanatory diagram for effecting control to shift the barycenter of the robot 301 backward and forward. The operation of the robotic system according to an embodiment of the present invention will be explained in detail by referring to FIGS. 1 to 5.

When the robot 301 performs motions allocated to the switch operation sections 107-1 to 107-n of the transmitter, the switch operation section, for example, the switch operation section 107-1 to which desired motions are allocated among the plural switch operation sections 107-1 to 107-n, is first operated.

The signal processing circuit 102 outputs a control signal representing the operations of the switch operation section 107-1 to the transmit/receive circuit 103. On the side of the receiving controller, the radio transmit/receive circuit 207 in the receiver 201 receives and demodulates the modulated control signal from the transmitter and outputs the modulated control signal as a control signal. The SPI signal transmit/receive circuit 208 outputs the demodulated control signal from the radio transmit/receive circuit 207.

In the control circuit 202, the SPI signal transmit/receive circuit 209 receives the control signal and outputs the control signal to the processing circuit 210. The processing circuit 210 performs a signal analyzing process of the control signal so as to analyze whether or not which one of switch operation sections 107-1 to 107-n has been manipulated or how much which one of the analog operation sections 108-1 to 108-n has been manipulated so as to effect the signal analyzing process 211. When the result of the signal analyzing process 211 proves that the operation switch section, for example, the operation section 107-1, has been manipulated, the processing circuit 210 reads out information about a motor, namely motion control information, which is stored in advance in the storage means in the control circuit 202 and required for effecting the motion allocated to the switch operation section 107-1 to effect the motion regeneration process 212. The motion control information includes information specifying a motor to be driven and the amount by which the motor is driven.

When the result of the signal analyzing process 211 proves that the analog operation sections 108-1 to 108-n have been operated, the processing circuit 210 creates barycenter position control information to control the motor corresponding to the operated section of the analog operation sections 108-1 to 108-n and the barycenter of the robot 301 in accordance with the manipulation amount of the analog operation sections 108-1 to 108-n to effect the barycenter position control process 213. The barycenter position control information includes information specifying a motor to be driven and the driving amount of the motor corresponding to the manipulation amount of the analog operation sections 108-1 to 108-n. In this instance, the analog operation sections 108-1 to 108-n are not manipulated. Thus, the barycenter position control information is not created in the barycenter position control process 213, and the barycenter position control is not carried out.

Next, the processing circuit 210 creates the control signal representing a motor to be driven and the driving amount thereof based on the motion control information and based on barucenter position control information, and outputs the control signal to the RS485 output circuit 204 to effect the motor control process 214. The control signal corresponds fundamentally to the signal in which the motion control information and the barycenter position control information are added. However, since the barycenter position control information is not created here, the control signal corresponds to the motion control information only.

The control circuit 202 outputs the control signal from the RS485 output circuit 204 to the driver 203. In the driver 203, the motor 206, . . . , 206, namely, the motor 206-1 to 206-n in FIG. 3 corresponding to the control signals are driven by the amount corresponding to the control signals. In this manner, the motors 206, . . . , 206 driven controls the joints corresponding to the motors. Thus, the robot 301 implements the motions allocated by the manipulated switch operation section 107-1. For example, when the motion allocated by the switch operation section 107-1 is a forward walking, the control signal instructs to drive the right ankle roll axis control motor 206-1, the left ankle roll axis control motor 206-2, the right ankle pitch axis control motor 206-3, the left ankle pitch axis control motor 206-4, the right knee control motor 206-5, the left knee control motor 206-6, the right hip joint pitch axis control motor 106-7, the left hip joint pitch axis control motor 106-8, the right hip joint roll axis control motor 106-9, and the left hip joint roll axis control motor 106-10 in a predetermined sequence and by a predetermined amount. In this manner, when the switch operation section 107-1 is operated to instruct the forward walking, the motors 206-1 to 206-10 are driven in a predetermined order and by a predetermined amount to walk the robot 301 forward.

The operation in the case where the barycenter position of the robot 301 shifts will be explained. In this case, at least the analog operation section 108-1 to which the horizontal movement of the barycenter position is allocated or the analog operation section 108-2 to which the forward/backward movement of the barycenter position is allocated is manipulated. For example, when the analog operation section 108-1 to which the horizontal movement of the barycenter position is allocated is manipulated, the signal processing circuit 102 outputs to the transmit/receive circuit 103 the control signal representing the manipulation of the analog operation section 108-1 and the manipulation amount of the analog operation section 108-1. The transmit/receive circuit 103 modulates and wirelessly transmits the control signal.

The receiving controller side demodulates the control signal modulated by the receiver 201 and outputs the demodulated control signal via the SPI signal transmit/receive circuit 208. The processing circuit 210 in the control circuit 202 analyzes the control signal. Thus, the switch operation sections 107-1 to 107-n and the analog operation sections 108-1 to 108-n manipulated are subjected to an amount manipulation analysis to effect the signal analyzing process 211. In this process, the processing circuit 210 judges that the operation switch section 107 has not been manipulated as a result of the signal analyzing process 211, and does not output the motion control information in the motion regeneration process 212.

On the other hand, the processing circuit 210 judges that the analog operation section 108 has been manipulated as a result of the signal analyzing process 211, and then creates the barycenter position control information for controlling the motor corresponding to the manipulated analog operation section 108-1 to the barycenter position of the robot 301 according to the manipulation amount of the analog operation section 108-1 to effect the barycenter position control process 213.

In the next step, the processing circuit 210 creates the control signal representing a driven motor and the driving amount thereof based on the motion control information and based on the barycenter position control information, and outputs the control signal to the RS485 output circuit 204 for effecting the motor control process 214. The control signal is by nature the signal in which the motion control information and the barycenter position control information are added. However, since the motion control information is not output here, the control information corresponds to the barycenter position control information only.

The driver 203 drives the motor corresponding to the control signal by the corresponding amount. The motors for controlling the barycenter position movement correspond to a hip joint driving motor and an ankle joint driving motor, respectively. The analog operation section 108-1 controls the movement of the barycenter position leftward and rightward. Since the control signal shifts the barycenter position leftward and rightward, the hip joint control motors to control are a right hip joint roll axis control motor 206-9 and a left hip joint roll axis control motor 206-10, respectively. The ankle control motors to control are a right ankle roll axis control motor 206-1 and a left ankle roll axis control motor 206-2, respectively.

In the above control, when the barycenter position of the robot 301 shifts rightward, the robot 301 moves between the upright position in FIG. 4(a) and the right barycenter shift position in FIG. 4(b) by the amount corresponding to the operation amount of the analog operation section 108-1. When the barycenter position shifts leftward, the robot 301 moves between the upright position in FIG. 4(a) and the left barycenter shift position in FIG. 4(c) by the amount corresponding to the operation amount of the analog operation section 108-1.

In order to shift the barycenter position of the robot 301 forward and backward, the operation section 108-3 is operated. When the barycenter position shifts forward and backward, the right hip joint pitch axis control motor 206-7 and the left hip joint axis control motor 206-8 are controlled as a joint control motor. The right ankle pitch axis control motor 206-3 and the left ankle pitch axis control motor 206-4 are controlled as an ankle control motor.

When the barycenter position of the robot 301 shifts forward and backward, the robot 301 moves between the upright position in FIG. 5(a) and the rear barycenter shift position in FIG. 5(b) by the amount corresponding to the operation amount of the analog operation section 108-2. When the barycenter position shifts forward, the robot 301 moves between the upright position in FIG. 5(a) and the front barycenter shift position in FIG. 5(c) by the amount corresponding to the operation amount of the analog operation section 108-2.

Next, the case where any one of the switch operation sections 107-1 to 107-n and any one of the analog operation sections 108-12 to 108-n are operated at the same time will be explained hereinafter. When the switch operation section 107 and the analog operation section 108-1 are operated at once, the barycenter position will move horizontally upon walking so that the robot 301 can walk while turning right or left. The operation in the case where the forward walk allocation operation and horizontal barycenter position shift operation are performed simultaneously will be explained in detail hereinafter.

First, while the switch operation section 107-1 allocated for walking is operated, the analog operation section 108-1 for controlling the horizontal barycenter position shift is operated by a predetermined amount. The signal processing circuit 102 outputs the control signal representing the amount of operation of the analog operation section 108-1, together with the operations of the switch operation section 107-1 and the analog operation section 108-1, and the transmit/receive circuit 103 modulates and wirelessly transmits the control signal.

On the receiving controller side, the radio transmit/receive circuit 207 receives, demodulates and outputs the demodulated control signal from the transmitter. The SPI signal transmit/receive circuit 208 outputs the demodulated control signal from the radio transmit/receive circuit 207.

In the control circuit 202, the SPI signal transmit/receive circuit 209 receives the control signal and outputs the control signal to the processing circuit 210. The processing circuit 210 performs a signal analysis process of the control signal. Thus, the processing circuit 210 analyzes the operated one of the switch operation sections 107-1 to 107-n and the operated one of the analog operation sections 108-1 to 108-n, and the operation amount of an operated one of the analog operation sections 108-1 to 108-n for effecting the signal analyzing process 211.

When it is judged that the switch operation section 107-1 in the signal analyzing process 211 has been operated, the processing circuit 210 reads out information, that is, motion control information about a motor which is stored in advance in the storage means in the control circuit 202 and required for driving the operation allocated to the operated switch operation section 107-1 for effecting motion regeneration process 212. The motion control information includes information specifying a motor to be driven and the driving amount thereof.

When it is judged that the analog operation section 108-1 in the signal analyzing process 211 has been operated, the processing circuit 210 generates barycenter position control information for controlling the motor corresponding to the operated analog operation section 108-1 by the amount corresponding to the operation amount of the analog operation section 108-1 for effecting the barycenter position control process 213. The barycenter position control information includes information specifying a motor to be driven and the driving amount of the motor. The processing circuit 210 creates the control signal representing the motor to be driven and the driving amount thereof based on the motion control information and based on the barycenter position control information and outputs the control signal to the RS485 output circuit 204 for effecting the motor control process 214. The control signal corresponds to the signal in which the motion control information and the barycenter position control information are added. The control circuit 202 outputs the control signal from the RS485 output circuit 204 to the driver 203.

The driver 203 drives the motors 206-1 to 206-n corresponding to the control signal by the amount in which the motion control information and the barycenter control information are added. For example, the motor to be driven with the motion control information and the barycenter position control information is rotatably controlled by the angular control amount ($\theta1+\theta2$) based on the control signal, where $\theta1$ is the motor angular control amount based on the motion control information and $\theta2$ is the motor angular control amount based on the barycenter position control information. Thus, the motors 206-1 to 206-n driven control the corresponding joints, respectively.

The robot 301 implements the motions allocated to the operated switch operation sections 107-1 to 107-n while the barycenter position thereof changes. For example, when the motion allocated to the operated switch operation section 107-1 corresponds to a forward walking motion and the operated analog operation section 108-1 shifts the barycenter right, the robot 301 performs forward walking while turning right. Moreover, when the motion allocated to the operated switch operation section 107-1 corresponds to a forward walking motion and the operated analog operation section 108-2 shifts the barycenter leftward, the robot 301 performs forward walking while turning left.

As described above, the operation of the robot 301 is controlled with the use of the switch operation section 107-1 to 107-n, which instructs the predetermined motion allocated in advance and the analog operation sections 108-1 to 108-n which instructs attitude control in an analogous manner. This feature allows the robot 301 to be operated simply and variously. The barycenter position can be shifted in real time by the predetermined amount according to the operation of the analog operation sections 108-1 to 108-n.

According to the present invention, the motor for moving at least the hip joint and the ankle joint of the robot 301 is driven to change the barycenter position thereof. Thus, the barycenter position movement can be realized by a simple operation. Furthermore, it is possible to smoothly change the moving direction by shifting the barycenter while walking, such as shuffling or brisk walking. In the present embodiment, the barycenter movement has been explained as an example of an analog attitude control operation. However, other attitude control operations may be performed.

In the present embodiment, the example has been explained where the travel direction is changed by moving the barycenter position horizontally during forward walking. However, various operations can be realized even by moving the barycenter position forward and backward together with the movement allocated. For example, when a sudden stop is brought from brisk walking, shifting the barycenter position forward or backward so as to prevent falling and achieve a stable stopping operation.

Even when the robot is walking along the slope, shifting the barycenter forward or backward allow the robot to walk in stable state. When the robot performs a punching operation, shifting the barycenter position forward in concert with the punching operation effectively allows the robot to give a destructive punch. In the present embodiment, the hip joint and the ankle joint are controlled so as to shift the barycenter position. However, by stretching the arm in cooperation with the hip joint and the ankle joint, the barycenter position may be shifted. Furthermore, the barycenter position may be shifted by controllably stretching the arm, instead of controlling the hip joint and the ankle joint. However, changing the barycenter position by controlling the hip joint and the ankle joint is preferable so as to effect various operations, for example, a powerful punching operation through moving the barycenter position forward, rather than changing the barycenter position by stretching the arm.

The present invention is applicable to various robotic systems used for indoor and outdoor applications, including hobby robotic system for controlling the robot remotely and wirelessly by radio waves or infrared rays.

While there has been shown and described what are at present considered the preferred embodiments of the invention, it will be obvious to those skilled in the art that various changes and modifications can be made without departing from the scope of the invention defined by the appended claims.

What is claimed is:

1. A robotic system comprising, a transmitter including a switch operation section operated by an operator for instructing an allocated operation, an analog operation section simultaneously operated by the operator for instructing an operation corresponding to an operation amount, control signal output means for outputting a control signal according to operations of said switch operation section and said analog operation section, and transmission means for transmitting said control signal;

a robot including plural joints and plural motors that drive said joints, respectively;

receiving means for receiving and outputting control signals from said transmitter; and control means for driving in response to control signals from said receiving means and controlling said joints of said robot, wherein said control means drives said motors in response to said control signals in such a way that operations instructed by said switch operation section and said analog operation section are added.

2. The robotic system as defined in claim 1, wherein said operation instructed by said analog operation section corresponds to an attitude control operation of said robot.

3. The robotic system as defined in claim 2, wherein said attitude control operation shifts the barycenter position of said robot.

4. The robotic system as defined in claim 3, wherein said control means drives motors that respectively move at least an ankle joint and a hip joint of said robot, to shift said barycentric position.

5. The robotic system as defined in claim 4, wherein at least a roll axis control motor and a pitch axis control motor are mounted to each joint, as a motor for controlling said ankle joint and said hip joint.

* * * * *